(12) United States Patent
Messing et al.

(10) Patent No.: US 10,683,843 B2
(45) Date of Patent: Jun. 16, 2020

(54) METHOD FOR OPERATING A WIND TURBINE

(71) Applicant: Wobben Properties GmbH, Aurich (DE)

(72) Inventors: Ralf Messing, Aurich (DE); Rainer Wortelker, Emden (DE); Nils Noffke, Aurich (DE); Marwin Frauenlob, Aurich (DE); Christian Frank Napierala, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/091,901

(22) PCT Filed: Apr. 10, 2017

(86) PCT No.: PCT/EP2017/058553
§ 371 (c)(1),
(2) Date: Oct. 5, 2018

(87) PCT Pub. No.: WO2017/178429
PCT Pub. Date: Oct. 19, 2017

(65) Prior Publication Data
US 2019/0113020 A1    Apr. 18, 2019

(30) Foreign Application Priority Data

Apr. 11, 2016  (DE) .................. 10 2016 106 590

(51) Int. Cl.
*F03D 7/02* (2006.01)
*F03D 15/20* (2016.01)

(52) U.S. Cl.
CPC .......... *F03D 7/028* (2013.01); *F03D 7/0224* (2013.01); *F03D 7/0276* (2013.01); *F03D 15/20* (2016.05);
(Continued)

(58) Field of Classification Search
USPC .................................. 290/44, 55; 700/287
See application file for complete search history.

(56) References Cited

U.S. PATENT DOCUMENTS 7,528,496 B2 *  5/2009  Fortmann ............. F03D 7/0264
                                                            290/44
7,629,702 B2  12/2009  Schubert
(Continued)

FOREIGN PATENT DOCUMENTS

CN       101031720 A     9/2007
CN       102536670 A     7/2012
(Continued)

*Primary Examiner* — Pedro J Cuevas
(74) *Attorney, Agent, or Firm* — Seed IP Law Group LLP

(57) ABSTRACT

A method for operating a wind power installation having a rotor with rotor blades with an adjustable blade angle is provided. The installation is operated in a full-load mode for delivering a system-specific maximum power and in a partial-load mode for delivering a lower power, up to the system-specific maximum power. The installation in the partial-load mode operates according to choice in a normal mode or a limited mode, in each case based on an operating characteristic, which specifies a relationship between a rotational speed (n) of the rotor and the power to be delivered. A first operating characteristic is provided for operating the installation in the normal mode, and at least one second operating characteristic is provided for operating in the limited mode. The second operating characteristic provides a higher power for at least one rotational speed range than the first operating characteristic for the rotational speed range.

15 Claims, 8 Drawing Sheets

(52) U.S. Cl.
CPC ... *F05B 2220/7066* (2013.01); *F05B 2260/96* (2013.01); *F05B 2270/1033* (2013.01); *F05B 2270/327* (2013.01); *F05B 2270/328* (2013.01); *F05B 2270/333* (2013.01); *F05B 2270/335* (2013.01); *Y02E 10/723* (2013.01); *Y02E 10/725* (2013.01)

(56) References Cited

U.S. PATENT DOCUMENTS

| | | | |
|---|---|---|---|
| 7,663,260 B2* | 2/2010 | Kabatzke | F03D 7/0276 |
| | | | 290/44 |
| 7,880,321 B2* | 2/2011 | Arinaga | F03D 7/0224 |
| | | | 290/44 |
| 8,143,734 B2* | 3/2012 | Steudel | F03D 7/0224 |
| | | | 290/43 |
| 8,338,978 B2 | 12/2012 | Yasugi et al. | |
| 8,736,094 B2* | 5/2014 | Wakasa | H02P 9/04 |
| | | | 290/44 |
| 8,779,611 B2* | 7/2014 | Kabatzke | F03D 7/0224 |
| | | | 290/44 |
| 8,779,617 B2 | 7/2014 | Egedal et al. | |
| 8,946,916 B2* | 2/2015 | Tarnowski | F03D 7/0276 |
| | | | 290/44 |
| 9,014,861 B2* | 4/2015 | Attia | H02P 9/007 |
| | | | 290/44 |
| 9,222,466 B2* | 12/2015 | Tarnowski | F03D 7/0284 |
| 9,915,244 B2* | 3/2018 | Tarnowski | F03D 7/0284 |
| 10,060,414 B2* | 8/2018 | Tarnowski | H02J 3/38 |
| 10,193,481 B2* | 1/2019 | Tarnowski | F03D 7/0276 |
| 10,371,124 B2* | 8/2019 | Wilson | F03D 7/0264 |
| 10,400,752 B2* | 9/2019 | Tarnowski | F03D 9/257 |
| 10,418,925 B2* | 9/2019 | Tarnowski | F03D 7/0284 |
| 2007/0085343 A1* | 4/2007 | Fortmann | F03D 7/0264 |
| | | | 290/44 |
| 2007/0154311 A1* | 7/2007 | Kabatzke | F03D 7/0224 |
| | | | 416/1 |
| 2008/0116690 A1* | 5/2008 | Kabatzke | F03D 7/0276 |
| | | | 290/44 |
| 2009/0224543 A1* | 9/2009 | Steudel | F03D 7/0224 |
| | | | 290/44 |
| 2010/0135798 A1 | 6/2010 | Eggleston | |
| 2010/0237618 A1* | 9/2010 | Arinaga | F03D 7/0224 |
| | | | 290/44 |
| 2010/0274401 A1* | 10/2010 | Kjaer | F03D 7/0284 |
| | | | 700/287 |
| 2012/0139244 A1 | 6/2012 | Bonnet | |
| 2012/0148402 A1* | 6/2012 | Kabatzke | F03D 7/0224 |
| | | | 416/1 |
| 2012/0161444 A1* | 6/2012 | Tarnowski | F03D 7/0276 |
| | | | 290/44 |
| 2012/0205912 A1* | 8/2012 | Wakasa | F03D 7/0284 |
| | | | 290/44 |
| 2013/0140818 A1 | 6/2013 | Matesanz Gil | |
| 2013/0140820 A1* | 6/2013 | Tarnowski | F03D 7/0284 |
| | | | 290/44 |
| 2013/0154263 A1 | 6/2013 | Attia | |
| 2013/0166082 A1* | 6/2013 | Ambekar | G05B 13/04 |
| | | | 700/287 |
| 2013/0187385 A1* | 7/2013 | Wakasa | H02P 9/04 |
| | | | 290/44 |
| 2013/0257051 A1* | 10/2013 | Spruce | F03D 7/028 |
| | | | 290/44 |
| 2013/0270827 A1* | 10/2013 | Couchman | F03D 7/028 |
| | | | 290/44 |
| 2014/0017081 A1* | 1/2014 | Esbensen | F03D 7/0224 |
| | | | 416/1 |
| 2015/0021912 A1* | 1/2015 | Bech | F03D 7/0276 |
| | | | 290/44 |
| 2015/0084338 A1* | 3/2015 | Tarnowski | F03D 7/0276 |
| | | | 290/44 |
| 2015/0120070 A1* | 4/2015 | Tarnowski | H02J 3/386 |
| | | | 700/287 |
| 2015/0137519 A1* | 5/2015 | Tarnowski | F03D 7/0284 |
| | | | 290/44 |
| 2015/0159626 A1* | 6/2015 | Tarnowski | F03D 7/028 |
| | | | 290/44 |
| 2016/0305402 A1* | 10/2016 | Caponetti | F03D 7/0264 |
| 2019/0109552 A1* | 4/2019 | Tarnowski | F03D 7/0276 |
| 2019/0360461 A1* | 11/2019 | Tarnowski | F03D 7/028 |
| 2020/0056585 A1* | 2/2020 | Messing | F03D 7/043 |
| 2020/0063713 A1* | 2/2020 | Messing | F03D 7/0296 |

FOREIGN PATENT DOCUMENTS

| | | |
|---|---|---|
| EP | 2463517 A1 | 6/2012 |
| WO | 2012108033 A1 | 8/2012 |

\* cited by examiner

METHOD FOR OPERATING A WIND TURBINE

BACKGROUND

Technical Field

The present invention relates to a method for operating a wind power installation and relates to a wind power installation.

Description of the Related Art

Wind power installations are known and are nowadays often being set up. It may happen that noise generated by wind power installations is undesired, or is felt to be undesired, and as a consequence of this low noise output levels are specified.

To achieve low noise output levels, it has been the practice until now to use reduced-power operating modes. As a result, the operating characteristic, that is to say the specification of the electrical output power in dependence on the rotational generator speed, which in the case of gearless machines is identical to the rotational rotor speed, of the optimized-power operating mode is lowered until the rated power of the reduced-power operating mode is reached. The rotational speed then obtained there in accordance with the operating mode can be referred to as the rated speed of the reduced-power operating mode. This reduced rated speed primarily determines the noise output level of the wind power installation that occurs.

An advantage of this procedure is that the wind power installation can be operated in partial-load mode to a possible extent at the optimum tip speed ratio, and the installation can also otherwise be operated in normal mode, that is to say in a mode in which a limited noise output level is not specified. All that is necessary is to make sure that the required limit value is not exceeded. In this way it can be ensured that there is a flow around the rotor blade without breakaway effects when the wind power installation is otherwise operated in the usual way. A disadvantage here is of course that, in the reduced-power mode, the installation is not operated with optimum yield, and there can consequently be high losses of yield if the installation has to be operated in the reduced-power mode in order to comply with more restrictive noise emission requirements as compared with operation in normal mode, for example at night time.

The German Patent and Trademark Office has searched the following prior art in the priority application for the present application: US 2013/0154263 A1, US 2010/0135798 A1 and US 2013/0140818 A1.

BRIEF SUMMARY

While complying with noise emission requirements, achieving a yield that is as high as possible is intended.

One idea of the invention is consequently to modify the operational control in such a way that the reduced rated speed, and consequently the noise output level, does not change, but the reduced rated power obtained at the reduced rated speed is increased, and consequently the yield of the installation is also increased.

For this purpose, a method for operating a wind power installation that has a rotor with rotor blades which are adjustable in their blade angle is provided. It is in this case provided that the wind power installation is operated in a full-load mode for delivering a system-specific maximum power and in a partial-load mode for delivering a lower power, up to this system-specific maximum power. The system-specific maximum power is usually the rated power of the wind power installation. The range in which the wind power installation is operated in full-load mode and the range in which the wind power installation is operated in partial-load mode may also be referred to, respectively, as the full-load range and the partial-load range. The partial-load range may extend from a cut-in wind speed, at which the wind power installation first begins to operate, to a rated wind speed. The full-load range follows on correspondingly for higher wind speeds.

The description herein relates substantially to the partial-load range or the partial-load mode. It is then also provided for the partial-load mode that the wind power installation operates according to choice in a normal mode or a limited mode. These are consequently two operating modes, which however both relate to the partial-load range. Each of these two operating modes, that is to say the normal operating mode and the limited operating mode, is based on an operating characteristic, which specifies a relationship between a rotational speed of the rotor and the power to be delivered. In the case of gearless wind power installations, that corresponds to a specification of the electrical output power in dependence on the rotational generator speed. If there are gear mechanisms, the rotational generator speed can be taken as a basis, or a re-calculation can be performed with a factor corresponding to the transmission ratio of the gear mechanism.

An operating characteristic to this extent reproduces a relationship between the rotational speed and the power. This relationship is classically stored in a characteristic, but may also be functionally defined. Depending on the process computer, higher-order functions, nonlinear functions, polynomial functions and/or composite functions can come into consideration for this. What is decisive is that a relationship between the rotational speed and the power is stored. Incidentally, the same also applies to a power-dependent blade-angle characteristic.

It is then also proposed that a first operating characteristic is provided for operating the wind power installation in the normal mode and at least one second operating characteristic is provided for operating the wind power installation in the limited mode. Further operating characteristics may also be provided, in particular whenever various limitations should be observed. For ease of understanding, however, the consideration of a second operating characteristic should be sufficient, especially since at present the wind power installation can in any case only be operated with one operating characteristic.

It is then proposed that the second operating characteristic, which is therefore used for the limited mode, provides a higher power for at least one rotational speed range than the first operating characteristic for the same rotational speed range.

Consequently, a higher power is provided for the limited mode, which specifically is limited in particular in order to meet a noise emission requirement. It should be noted in this respect that, for this, the operating characteristic is altered, at least in a certain portion, with respect to the normal mode. Providing a higher power for an individual rotational speed value may be of a lesser concern that generally altering the operating characteristic, and consequently providing a higher power at least for one entire rotational speed range.

It is also important to note that these identical rotational speed ranges of the two operating characteristics, which however are to have different power outputs, are not based on identical wind speeds. It is after all assumed that, in normal operation in the partial-load mode, the maximum power that can be taken from the wind is indeed taken, at least in the optimum case. It is correspondingly likely to be difficult to then increase the power still further for the same wind speed.

Instead, the operational control of the wind power installation is provided. The method for operating a wind power installation is therefore a corresponding operational control of the wind power installation. Therefore, different rotational-speed/power characteristics are specified. To give an illustrative example, in practical implementation it may appear that the wind turns the wind power installation with a certain rotational speed. Depending on this rotational speed, a power is then set in accordance with the respective operating characteristic. If this power corresponds precisely to the power that can be taken from the wind with the settings at that moment, the wind power installation is in a steady operating state. If, however, this power cannot be taken at that moment, and has thus as it were been set too high, this has the effect that the rotational speed is reduced. Then, a new, specifically reduced power is set in accordance with the reduced rotational speed, until it corresponds to the power that can be taken and a steady operating state is reached. If the power has been set too low, the rotational speed will correspondingly increase, and the power is then also increased until a correspondingly higher operating point is reached.

This process can, however, be carried out for different operating characteristics. Since the power delivered corresponds to the power that can be taken from the wind, a higher power can also be assigned to a stronger wind. Because the second operating characteristic has, at least in a certain portion, a higher power for a rotational speed range than the first operating characteristic, it is also based on a stronger wind. Correspondingly, said rotational speed range of the second operating characteristic is assigned to a higher wind speed than the same rotational speed range of the first operating characteristic.

This, however, serves for explanation, and the operational control operates instead in the way described, such that it is based on the operating characteristic and correspondingly sets a power depending on the rotational speed. The wind speed does not have to be considered here, even though it is of course necessary to operate the wind power installation.

It can in this way be achieved that the power in the case of the limited mode is already increased at lower rotational speeds, whereby a power that is as high as possible is generated, or an operating point with the highest possible generated power is achieved before the specified limit of the noise emission is reached, which is in particular an upper limit of the rotational speed permissible in that case. The power is therefore at a value that is as high as possible when this limit is reached.

It has also been recognized in this respect that, although the changed operating characteristic considered as a whole does not have to represent the optimum operation of the installation, it is achieved that as much power as possible is generated in this particular situation of the limitation.

One configuration proposes that a first power/blade-angle characteristic is provided for the normal mode and a second power/blade-angle characteristic is provided for the reduced mode, and the first power/blade-angle characteristic is selected together with the first operating characteristic in the normal mode and the second power/blade-angle characteristic is selected together with the second operating characteristic in the limited mode.

It has been recognized that the proposed different operating characteristics, that is to say the different rotational-speed/power characteristics, can be provided in particular by each rotational-speed/power characteristic being assigned a power/blade-angle characteristic. Particularly in this way it is possible to set different rotational speeds for the same wind speeds.

Preferably, the first and second power/blade-angle characteristics are specified in such a way that a profile angle of attack does not exceed a predetermined value. A profile angle of attack is the angle that is obtained between the chord of a profile and a local incident flow. This depends on the wind speed and the circumferential speed of the rotor. The different rotational-speed/power characteristics also result in different rotational speeds, and consequently different incident-flow angles, for the same wind speeds. This is compensated by different rotational-speed/blade characteristics.

It is proposed here that the first and second power/blade-angle characteristics are specified in such a way that no profile angle of attack exceeds a predetermined value. Preferably, this may be provided particularly for a middle region of the rotor blade, which extends approximately over a range of 30% to 80% along the longitudinal axis of the rotor blade.

According to one embodiment, it is proposed that, in the partial-load mode, at least a first rotational speed range and a second rotational speed range are provided. In other words, the partial-load range can be divided into two rotational speed ranges, specifically a low range and a high range. Since they are in the partial-load range, both rotational speed ranges are however still arranged before the full-load range. The first rotational speed range comprises rotational speeds up to a first range speed; it therefore comprises the low rotational speeds, and the second rotational speed range comprises rotational speeds above this first range speed, that is to say higher rotational speeds. It has thus been proposed for this that the first and second operating characteristics coincide in the first rotational speed range and the second operating characteristic deviates from the first operating characteristic in the second rotational speed range such that, for the same rotational speed values, it specifies greater power values in each case than the first operating characteristic in relation to the same rotational speed values. In other words, the second operating characteristic leaves the first operating characteristic in the upward direction in the second rotational speed range if these characteristics are in a diagram in which the rotational speed is plotted on the x-axis and, dependent on it, the power is plotted on the y-axis.

It has consequently been recognized that, for both operating modes, that is to say the normal mode and the limited mode, initially, that is to say at low rotational speeds and consequently also at low wind speeds, operation can be performed in the same way. In this range, coinciding operating characteristics are correspondingly also respectively based on the same wind speed. Only at higher rotational speeds can the different mode of operation be performed. At the low rotational speeds, and consequently low wind speeds, a mode of operation that is as close as possible to being optimum can consequently be carried out even for the limited mode.

Preferably, the limited mode is based on a situation in which the rotational speed must not exceed a specified rotational speed limit value. That is the case in particular when the rotational speed is limited to a reduced rated speed, as already described above. Correspondingly, the second operating characteristic is only provided up to this rotational speed limit value. It may, however, also be further provided not to operate beyond this rotational speed limit, at least not for a sustained period of time, if this limited mode pertains. This may for example be a limited noise emission provided for night time. In this case, the second operating characteristic envisages providing a higher power output than the first operating characteristic even for rotational speeds below this rotational speed limit value. It should be particularly emphasized here that the second operating characteristic not only differs from the first operating characteristic in the rotational speed limit value of the first operating characteristic, but that a different mode, that is to say a different operational control, is already provided well before.

According to one configuration, it is proposed that the normal mode and the limited mode are respectively characterized by a variation of the tip speed ratio in dependence on the wind speed. Such a characterization by the variation of the tip speed ratio can be generally provided. Here it is proposed that, at least in a certain portion, the variation of the tip speed ratio of the normal mode lies above the variation of the tip speed ratio of the limited mode. In this portion, the tip speed ratio of the normal mode for the underlying wind speed is therefore greater than for the limited mode.

This makes it clear that, according to this embodiment, it is proposed to make the aerodynamic situation fundamentally different for the normal mode on the one hand and the limited mode on the other hand. Preferably, the variation of the tip speed ratio for the normal mode and the limited mode is the same for low wind speeds and only differs as from a predetermined wind speed, from which the tip speed ratio of the normal mode is then greater than that of the limited mode. The tip speed ratio is the ratio of the circumferential speed of the rotor of the wind power installation to the wind speed. In the case of a purely normalized or only comparative consideration, the ratio of the rotational speed of the rotor to the wind speed may also be considered. The proposed higher tip speed ratio of the normal mode consequently also suggests that there the installation is operated with a higher rotational speed in the normal mode than is the case for the same wind speed in the limited mode.

According to one embodiment, it is proposed that, at least for the limited mode, an adjustment of the blade angle before reaching the rotational speed limit value is provided. If therefore there is a limited rotational speed that the limited mode must observe as a specified limitation, it is proposed that, even before reaching this rotational speed limit value, the rotor blade is turned slightly out of the wind, its blade angle is therefore increased. Purely as a precaution, it is pointed out that the increase in the blade angle means here an adjustment in the direction of the rotor blade toward the feathered position.

With this proposal of adjusting the blade angle before reaching the rotational speed limit value, the proposed lower tip speed ratio can also be realized. With this change of the blade angle, the rotational speed can be reduced, which leads to a reduction in the tip speed ratio with the same wind. This adjustment of the blade angle particularly for the limited mode is preferably made to match the second operating characteristic, or the second operating characteristic is made to match this early adjustment of the blade angle. This combination of the corresponding second operating characteristic and the adjustment of the blade angle is also a particularly good way of accomplishing the idea that the operational control is modified such that the reduced rated speed, and consequently the noise output level, is not changed or is not exceeded, the power obtained at the reduced rated speed, that is to say the power that can be generated, is increased, and consequently, in spite of complying with specifications, an increase in yield can be achieved.

According to a further configuration, it is proposed that, when operating the wind power installation in the normal mode up to a first reference wind speed or until reaching a first reference rotational speed, the blade angle has a constant value, and then, as the wind speed increases further, or the rotational speed increases further, and in dependence on the wind speed or in dependence on the rotational speed, the blade angle is increased. The same is proposed when operating the wind power installation in the limited mode, but with respect to a second reference speed or with respect to a second reference rotational speed. In this case, it is proposed that the first reference speed is greater than the second reference speed or that the first reference rotational speed is greater than the second reference rotational speed. It is consequently proposed that, in the partial-load range, the blade angle can already be adjusted even in the normal mode, but an adjustment of the blade angle tends to take place in the limited mode. It is particularly achieved in this way that, in the normal mode, optimum operation without blade adjustment is carried out for as long as possible, or at least somewhat longer, whereas for the limited mode, this optimal operation is already abandoned at an early time in order to aim for the specified limit, in particular the rotational speed limit value, and consequently to achieve as high a yield as possible in spite of the limit.

According to a further embodiment, it is proposed that the first operating characteristic is provided for guiding the wind power installation to an operating point with rated power and has in a portion before or up to this operating point a first power gradient dP/dn. In a similar way, it is proposed for the second operating characteristic that it is provided for guiding the wind power installations to a reduced operating point with reduced power in comparison with the rated power and to have in a portion before or up to this reduced operating point a second power gradient dP/dn. These two power gradients consequently designate a change in the power with respect to a change in the rotational speed, that is to say a power increase with respect to the increase in rotational speed. It is mathematically correct to designate this as dP/dn, where P is the power and n is the rotational speed.

It has thus been proposed for this that the two power gradients are the same. The two operating characteristics therefore aim for different operating points, specifically the operating point with rated power or the reduced operating point with reduced power, but nevertheless have the same power gradient. It can in this way be achieved that the two operating characteristics can respectively achieve their operating point in a similar way. In this case, preferably the second operating characteristic takes over the first power gradient as the second power gradient and the underlying installation control of the first operating characteristic, that is to say of the normal mode, is hereby transferred to the second operating characteristic. In this way, a similar control of the first operating characteristic can be adapted in spite of the reduced operating point of the second operating characteristic.

It is of course also possible here to provide variations, in which for example the second power gradient differs from the first power gradient by 10%, to name just one example. It is proposed that these power gradients are the same, even though small deviations exist, but the underlying idea can nevertheless still be achieved, at least partially.

Preferably, the method is characterized in that, for controlling the wind power installation in partial-load mode by means of a rotational-speed/power controller, a power (P) to be generated by the wind power installation is specified in dependence on a detected rotational speed (n) and the power specified by the rotational-speed/power controller is passed to a power adjusting means of the wind power installation, in order to set this specified power.

Here there is stored in particular a rotational-speed/power characteristic which specifies a fixed relationship between the rotational speed and the power. Depending on the detected rotational speed, this rotational speed/power controller outputs a power, which is set by means of the power adjusting means. The power adjusting means may be for example an adjusting means for setting an excitation current of a separately excited synchronous generator. Feedback of the set power is not envisaged. Rather, this rotational-speed/power controller has the effect that a rotational-speed/power operating point is set. This is so because, changing the power also has an effect on a counter-torque of the rotor, whereby the latter is decelerated to a greater or lesser extent than before the change, which in turn has an influence on the rotational speed.

It is also proposed in this respect that, by means of a power/blade-angle controller, the blade angle to be set is specified in dependence on the power specified by the rotational-speed/power controller, or in dependence on the power set by the power adjusting means, and the blade angle thus specified for adjusting the rotor blades is passed to blade adjusting units of the wind power installation. For this purpose, a power/blade-angle characteristic may be stored in the power/blade-angle controller, so that a blade angle according to the relationship permanently stored by the characteristic is output in relation to each input power value. This characteristic may also be configured in such a way that the blade angles do not change for relatively small power values and the blade angle is only changed when there are relatively high power values.

If the power specified by the rotational-speed/power controller is used here as an input variable, a clear relationship between the rotational speed and the blade angle can also be established in combination with the rotational-speed/power controller. If the power that is actually set is used, as a result the dynamics of the power setting can also influence the dynamics of the blade angle specification.

According to one embodiment, it is consequently proposed for the method that a first rotational-speed/power characteristic for the normal mode and a second rotational-speed/power characteristic for the reduced mode are stored in the rotational-speed/power controller and are selected according to the operating mode and that a first power/blade-angle characteristic for the normal mode and a second power/blade-angle characteristic for the reduced mode are stored in the power/blade-angle controller and are selected according to the operating mode. Consequently, as described above, characteristics for both controllers are stored here.

In order to select between normal mode and reduced mode, for both operating modes a characteristic is respectively stored in both controllers. The characteristics of the two controllers or one of the two controllers may also coincide in certain portions. For selecting between normal mode and reduced mode, the corresponding characteristic need only be selected in each of the two controllers. Preferably, further characteristics are stored if still further operating modes are to be realized.

Also proposed according to the invention is a wind power installation, which has a rotor with rotor blades with an adjustable blade angle and is operated by a method according to at least one of the embodiments described above. In particular, an operational control that operates on the basis of at least one method according to one of the embodiments described above is implemented in the wind power installation.

A wind power installation is preferably characterized in that it comprises a rotational-speed/power controller, which is provided for specifying a power (P) to be generated by the wind power installation in dependence on a detected rotational speed, and in that it comprises a power adjusting means, which is provided for setting the power specified by the rotational-speed/power controller. According to this embodiment, it also comprises a power/blade-angle controller, which is provided for setting the blade angle to be set in dependence on the power specified by the rotational-speed/power controller or for specifying it in dependence on the power set by the power adjusting means, and it comprises blade adjusting units, which are provided for setting the specified blade angle of the rotor blades. The power setting and the blade-angle setting can be carried out by these elements of the wind power installation in the way that has been explained above in connection with the method.

According to one embodiment, the wind power installation is characterized in that a first rotational-speed/power characteristic for the normal mode and a second rotational-speed/power characteristic for the reduced mode are stored in the rotational-speed/power controller and are selected according to the operating mode and in that a first power/blade-angle characteristic for the normal mode and a second power/blade-angle characteristic for the reduced mode are stored in the power/blade-angle controller and are selected according to the operating mode. In this way, the selection of normal operation or operation at reduced power can take place easily by selection of the corresponding characteristics.

Also proposed is a wind farm with a number of wind power installations, of which at least one wind power installation is operated as described according to one embodiment above, in particular has implemented an operational control as mentioned.

It may also be the case with a wind farm that it is for example set up in the vicinity of populated areas and a limited noise emission must be observed. It is then particularly important that the yield of each wind power installation is high, so that such improvements of the yield are accumulated. In particular, a wind farm is such that all of its wind power installations can feed into an electrical supply grid via a common grid connection point. An increase in yield, that is to say in particular an increase in power, also allows a stabilization of the grid to be achieved, or a destabilization of the grid to be prevented. If, for example, a night-time noise reduction is required for an entire wind farm, or at least for a number of wind power installations of the wind farm, this can lead to a great drop in power. If, for example, all of the wind power installations must reduce their power at a specific time, this power reduction accumulates and is possibly noticeable in the electrical supply grid as a result of the common feeding via the common grid connection point. An increase in yield would at the same time achieve the effect here that the power reduction turns out to be much less.

The proposed solution can be realized on variable-speed, pitch-controlled wind power installations, which can be operated with different operating characteristics, each operating characteristic preferably being assigned a pitch characteristic of its own.

With the solution, the aim is to increase particularly the annual yields of a pitch-controlled, variable-speed wind power installation when the wind power installation is operated with reduced rated power and rotational speed as compared with the optimized-power mode, that is to say the normal mode, in order not to exceed a required maximum noise output level.

BRIEF DESCRIPTION OF THE SEVERAL VIEWS OF THE DRAWINGS

The invention is now explained in more detail below on the basis of embodiments with reference to the accompanying figures.

DETAILED DESCRIPTION

Figure 1:
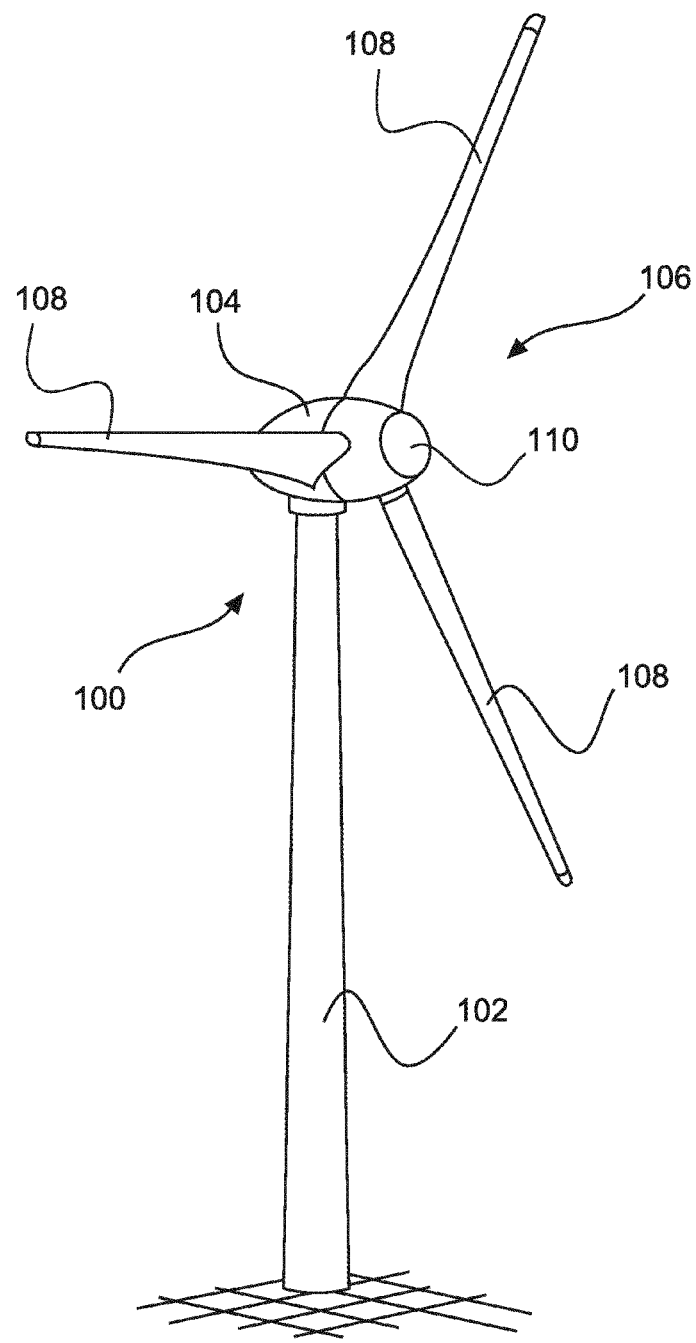
FIG. 1 shows a wind power installation in a perspective representation.

FIG. 1 shows a wind power installation 100 with a tower 102 and a nacelle 104. Arranged on the nacelle 104 is a rotor 106 with three rotor blades 108 and a spinner 110. During operation, the rotor 106 is set in a rotary motion by the wind, and thereby drives a generator in the nacelle 104.

Figure 2:
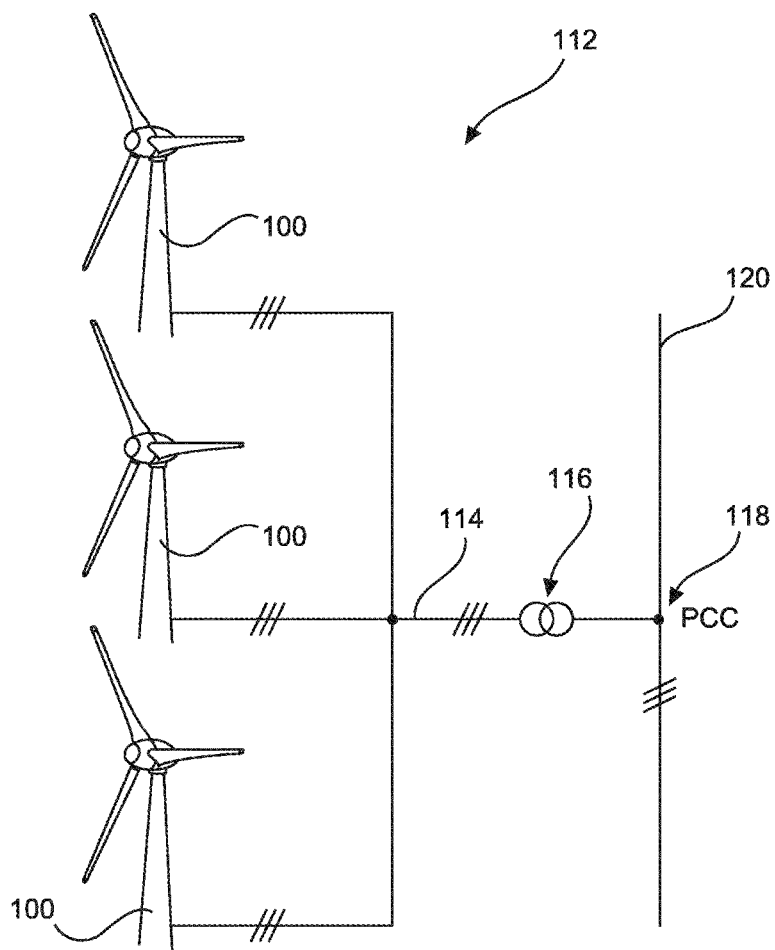
FIG. 2 schematically shows a wind farm.

FIG. 2 shows a wind farm 112 with, by way of example, three wind power installations 100, which may be the same or different. The three wind power installations 100 are consequently representative of essentially any number of wind power installations of a wind farm 112. The wind power installations 100 provide their power, to be specific in particular the electricity generated, by way of an electrical farm grid 114. In this case, the electricity or power respectively generated by the individual wind power installations 100 are added together and there is usually a transformer 116, which steps up the voltage in the farm in order then to feed into the supply grid 120 at the feed-in point 118, which is also referred to generally as the PCC. FIG. 2 is a simplified representation of a wind farm 112. Although FIG. 2 does not show a controller, a controller is present. It is also possible for example for the farm grid 114 to be designed differently, in that for example there is also a transformer at the output of each wind power installation 100, to name just one other exemplary embodiment.

Figure 3:
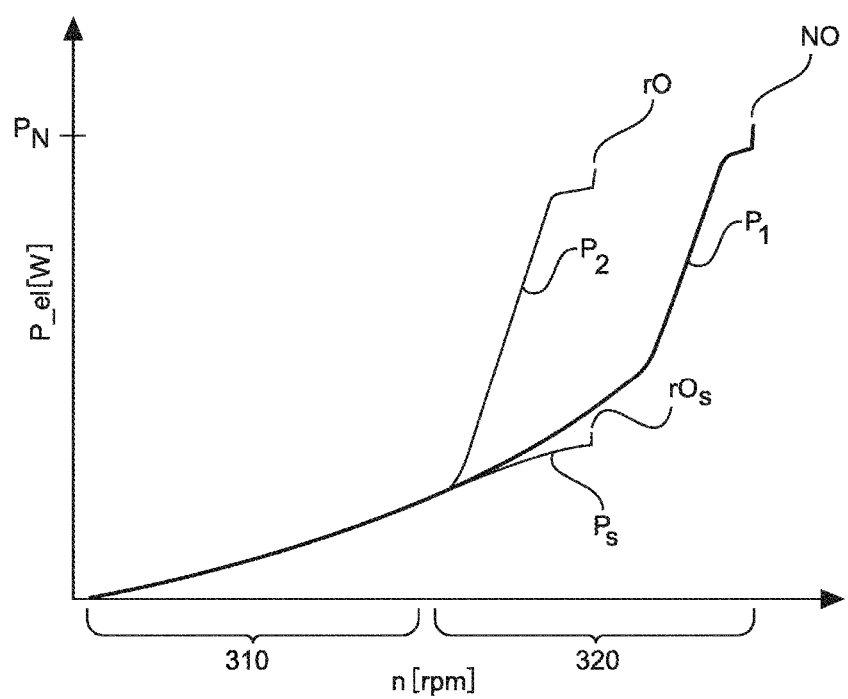
FIG. 3 illustrates a comparison between different operating characteristics.

FIG. 3 shows different operating characteristics in the example of a wind power installation. The characteristics are plotted against the rotational speed. These operating characteristics consequently show the functional relationship between the electrical output power $P_{el}$ of the wind power installation and the rotational rotor speed n, which in the case of a gearless wind power installation, which is taken as a basis here for all of the figures, corresponds to the rotational generator speed. In FIG. 3, $P_1$ designates the characteristic that is taken as a basis for an optimum-power operating mode, specifically a normal mode. This characteristic consequently represents the first operating characteristic. Depicted as $P_s$ is an operating characteristic in the case of which there is a reduced-power operating mode, which is associated with a predicted noise output level with respect to the wind speed at hub height. For this operating characteristic $P_s$ there is a reduced rated speed, at which the predicted noise output level is maintained.

These two operating characteristics $P_1$ and $P_s$ are substantially identical, apart from that the operating characteristic $P_s$ ends earlier and, shortly before, also departs from the operating characteristic $P_1$ in the downward direction, in order not to exceed the reduced rated speed.

Now proposed as a departure from this comparative variation $P_s$ is the operating characteristic $P_2$, which represents the second operating characteristic and is correspondingly assigned to the limited mode. In the case of this characteristic, the characteristic $P_1$, and consequently also the optimum-power partial-load tip speed ratio, is diverged from at a low rotational speed, in order with the gradient $dP_{el}/dn$ that is the same as in the case of the operating characteristic $P_1$ to reach the reduced rated power of the generator fitted in the wind power installation under investigation that is the maximum achievable at the reduced rotational speed.

It can consequently be seen in FIG. 3 that, from a specific rotational speed range, the second operating characteristic $P_2$ has a higher power than the first operating characteristic $P_1$.

This second operating characteristic $P_2$ consequently diverges from the first operating characteristic $P_1$ at the stated point in order to aim for a reduced operating point rO, which although it has a lower power than the rated operating point NO has significantly more power than the reduced comparative operating point $rO_s$.

It can also be seen in FIG. 3 that the first and second operating characteristics $P_1$ and $P_2$ run together in a first rotational speed range 310 and no longer run together in a second rotational speed range 320, and that, if it exists at all in any case, there the second operating characteristic has greater power values, and specifies greater power values for the operational control.

Figure 4:
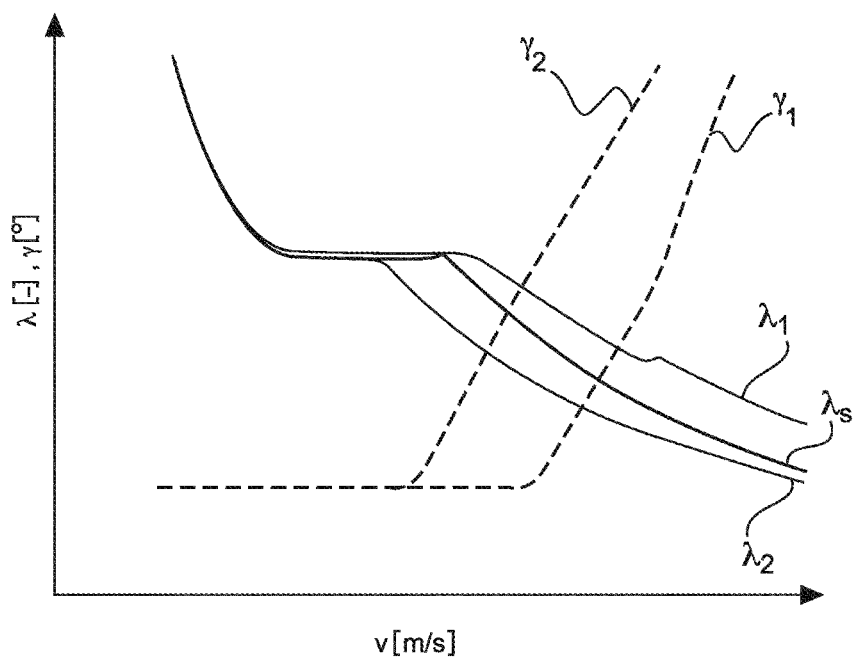
FIG. 4 illustrates a comparison between different variations for tip angle ratios and for blade angles.

FIG. 4 firstly shows three tip speed ratios $\lambda_1$, $\lambda_2$ and $\lambda_s$. These tip speed ratios are plotted against the wind speed v in m/s. Also depicted are the blade angles $\gamma_1$ and $\gamma_2$ for the first and second operating characteristics. FIG. 4 consequently shows variations of the tip speed ratio and variations of the blade angle during the operation of the wind power installation with different characteristics.

It can be seen from the variations of the tip speed ratios represented that, with the operation of the wind power installation proposed according to the invention, the optimum tip speed ratio is already left at a lower wind speed. The wind power installation then also has lower tip speed ratios than is the case in normal mode until the rated wind speed is reached. It can be seen particularly that, at a certain wind speed, the tip speed ratio according to the characteristic $\lambda_2$ leaves a plateau and then always retains a smaller value as compared with the other variations of the tip speed ratios, in particular also as compared with the variation of the tip speed ratio $\lambda_1$ of the normal mode. But also as compared with the tip speed ratio $\lambda_s$, and consequently in comparison with the operating characteristic $P_s$ according to FIG. 3, which is given as a comparative characteristic, the tip speed ratio of the proposed solution $\lambda_2$ is lower.

The variations of the angle can also be seen in FIG. 4; accordingly, in the case of the second operating characteristic, the corresponding blade angle $\gamma_2$ is already increased at a low wind speed and, as a result, also supports the second characteristic $P_2$ shown in FIG. 3, which correspondingly leaves the first characteristic $P_1$ of the normal mode at an early time.

Normal operation however also already changes its blade angle $\gamma_1$ in the partial-load mode, that is to say in the partial load range, though only at a higher wind speed than in the reduced mode. The blade angle of the reduced mode is therefore changed much earlier than the blade angle of the normal mode.

An important, at least preferred component of the proposed solution is therefore that the alteration of the operating characteristic is also accompanied by an alteration of the pitch characteristic. Here, the pitch characteristic is the term used to refer to the relationship stored in the installation control between the electrical output power $P_{el}$ and the pitch angle of the rotor blades, here therefore $\gamma_1$ or $\gamma_2$. The pitch characteristic should therefore be adapted, because otherwise, with the proposed or resultant lowering of the tip speed ratios during operation with the second operating characteristic, breakaways of the flow at the rotor blade would have to be expected. This can have the effect of reducing the power and increasing the noise level. Consequently, not only a second operating characteristic but also a second pitch characteristic are preferably proposed.

Correspondingly proposed are the pitch characteristics, that is to say the variations of the blade angles $\gamma_1$ and $\gamma_2$, that are shown by way of example in FIG. 4. It can be clearly seen there that the pitching of the installation for the reduced mode is begun at much lower wind speeds, and the wind power installation is operated with much higher pitch angles. It is pointed out that the blade angle and the pitch angle, or simply pitch, can be used as synonymous terms. Correspondingly, a pitch characteristic is also a blade-angle characteristic.

Figure 5:
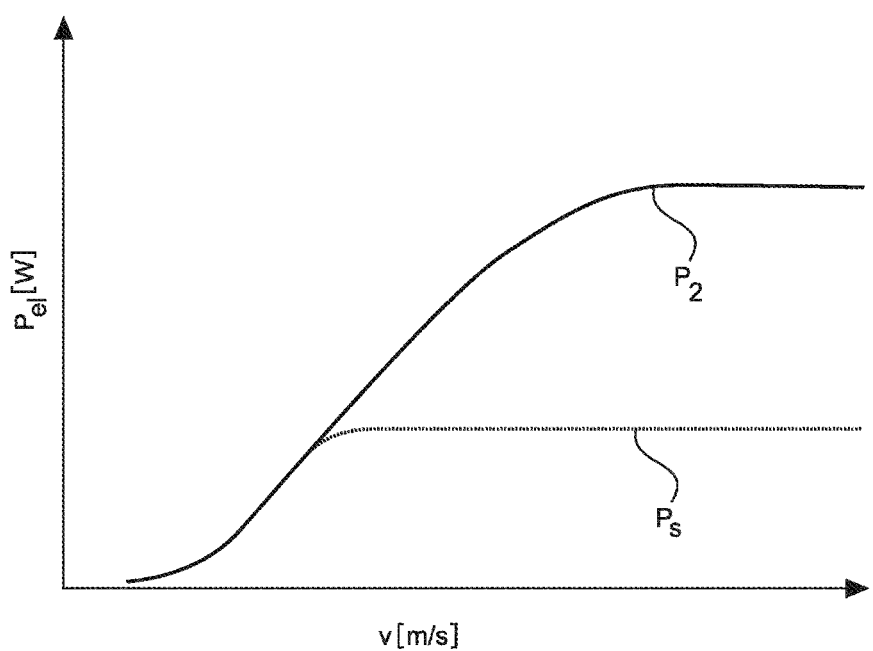
FIG. 5 illustrates a comparison between two power variations.
Figure 6:
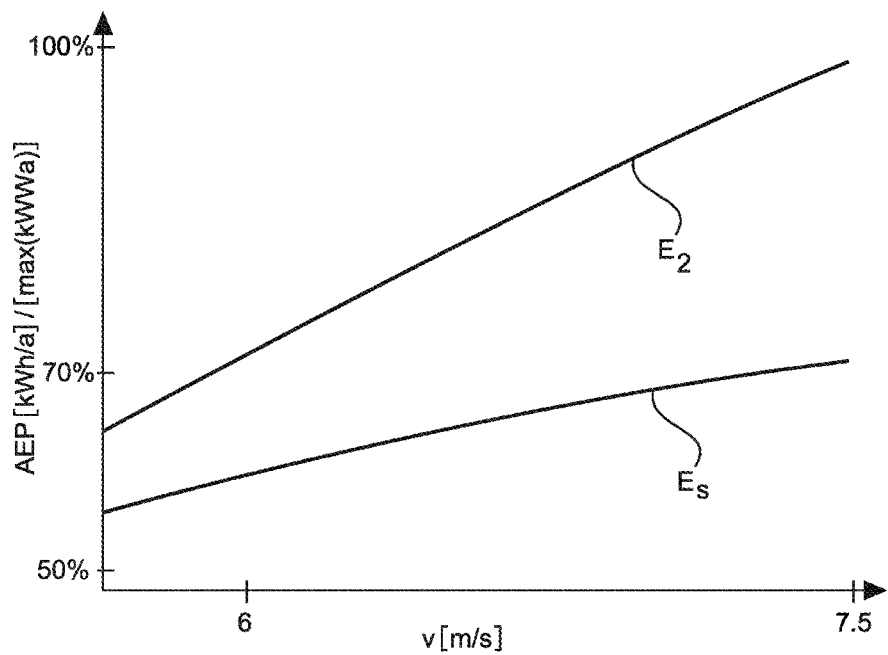
FIG. 6 shows increases of the annual yields achievable in dependence on the wind speed.

FIGS. 5 and 6 then show power curves and annual yields with a comparative operating characteristic, specifically according to $P_s$ of FIG. 3 and according to the proposed second operating characteristic $P_2$ according to FIG. 3.

In FIG. 5, for this the power $P_2$ according to the proposed second operating characteristic and the power $P_s$ according to the comparative operating characteristic are depicted. The designations are identical to those of FIG. 3, because the corresponding power $P_2$ or $P_s$ is shown in both cases, just with respect to different dependences, specifically the rotational speed n in FIG. 3 and the wind speed v according to FIG. 5. FIG. 5 shows in this case very clearly the achievable power gain of the second operating characteristic $P_2$.

Correspondingly, in FIG. 6, for instance predicted annual yields $E_2$ for the second operating characteristic and $E_S$ for the comparative operating characteristic are depicted. The gains are clearly evident in the power curve in FIG. 5 and in the annual yield in FIG. 6 when the installation is operated according to the new, proposed second operating characteristic. Assuming Rayleigh distribution of the wind, an increase in the annual yield of the order of approximately 30% could be obtained for the case given by way of example of the wind power installation under investigation in the case of an average annual wind speed of 7.5 m/s.

Figure 7:
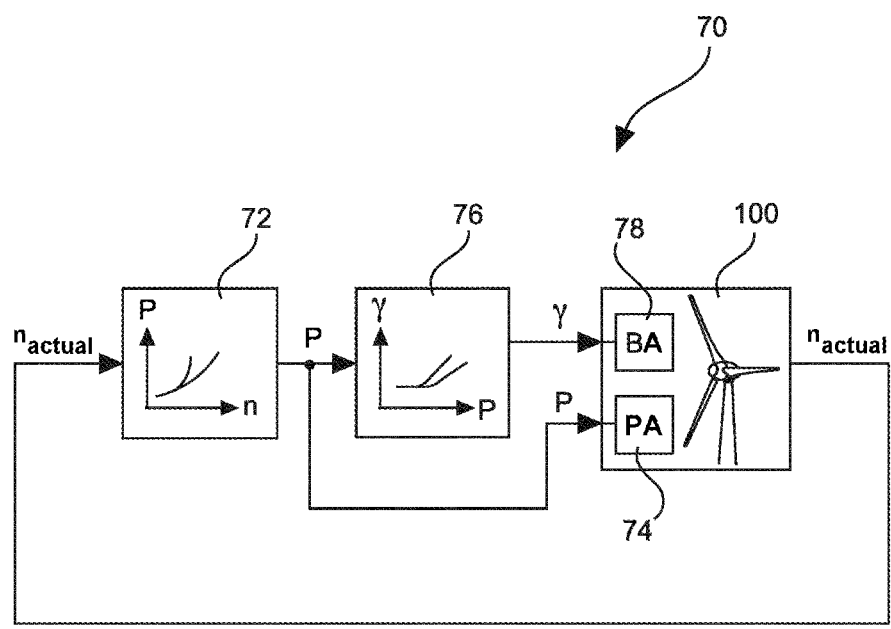
FIG. 7 schematically shows a control structure for operating the wind power installation in the partial-load range.

FIG. 7 schematically shows a control structure 70 for operating a wind power installation 100 in the partial-load range. It comprises a rotational-speed/power controller 72, which specifies a power P to be generated by the wind power installation 100 in dependence on the detected rotational speed n, that is to say the actual rotational speed. For this purpose, this power value P is passed to a power adjusting means 74, which here is only schematically represented as a block 74.

This power adjusting means may for example be a current adjuster for setting an excitation current, or comprise such an adjuster. The power adjusting means 74 may however for example also or additionally be realized by a controlled rectifier or a downstream step-up converter. The power adjusting means 74 is part of the wind power installation 100, which is likewise only schematically represented.

The power adjusting means 74 sets the specified power P and resulting from that, also in dependence on the wind, is the rotational speed n or $n_{actual}$, which is fed back to the rotational-speed/power controller 72.

The specified power P is also input into the power/blade-angle controller 76, which, dependent thereon, specifies a blade angle $\gamma$. The power/blade-angle controller 76 determines the blade angle $\gamma$ to be set in dependence on the power P specified by the rotational-speed/power controller 76. The blade angle $\gamma$ thus determined is then transferred to blade adjusting units 78, which are part of the wind power installation 100 and of which only one blade adjusting unit 78 is representatively depicted here. They then set the specified blade angle of the rotor blades.

The rotational-speed/power controller 72 and the power/blade-angle controller 76 have in each case two characteristics, which are respectively indicated in the block symbol, specifically one for the normal mode and one for the reduced mode. If one of these modes of operation is then selected, the corresponding characteristic is selected in both controllers, that is to say in the rotational-speed/power controller 72 and the power/blade-angle controller 76.

A verification of the stability of such a controlled system of the control structure 70 can optionally be carried out by known technical control methods, such as for example the method of harmonic balance. In this respect, it comes into consideration to carry out such a verification in a simulation.

Figure 8:
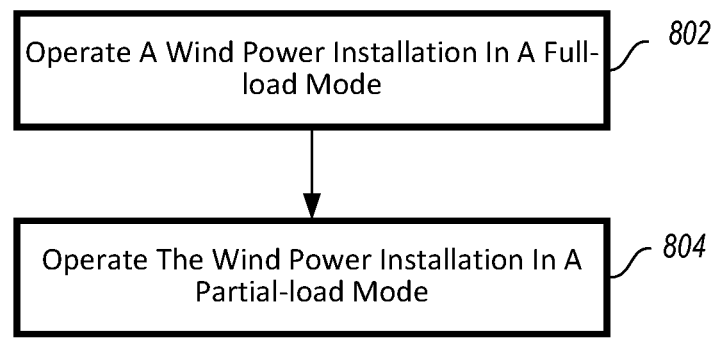
FIG. 8 shows a method for operating a wind power installation.

FIG. 8 shows a method 800 for operating a wind power installation. The wind power installation is operated in a full-load mode for delivering a system-specific maximum power at 802 and in a partial-load mode for delivering a lower power up to the system-specific maximum power 804.

The invention claimed is:

1. A method for operating a wind power installation having a rotor with rotor blades having adjustable blade angles, comprising:

operating the wind power installation in a full-load mode for delivering a system-specific maximum power, and operating the wind power installation in a partial-load mode for delivering a lower power up to the system-specific maximum power, and wherein operating the wind power installation in the partial-load mode includes operating the wind power installation selectively in normal mode in which the wind power installation is operated according to a first operating characteristic or in a limited mode in which the wind power installation is operated according to at least one second operating characteristic, the first and the at least one second operating characteristics being different from each other and each specifying a relationship between a rotational speed of the rotor and a power to be delivered, wherein the at least one second operating characteristic results in providing more power for at least one rotational speed range than the first operating characteristic for the at least one rotational speed range.

2. The method as claimed in claim 1, wherein a first power/blade-angle characteristic is provided for the normal mode and a second power/blade-angle characteristic is provided for the reduced mode, and the first power/blade-angle characteristic is selected together with the first operating characteristic in the normal mode and the second power/blade-angle characteristic is selected together with the second operating characteristic in the limited mode.

3. The method as claimed in claim 2, wherein the first and second power/blade-angle characteristics are specified such that a profile angle-of-attack does not exceed a predetermined value.

4. The method as claimed in claim 1, wherein in the partial-load mode:
- at least a first rotational speed range and a second rotational speed range are provided,
- the first rotational speed range includes rotational speeds up to a first speed,
- the second rotational speed range includes rotational speeds above the first speed, and
- the first and second operating characteristics coincide in the first rotational speed range and the second operating characteristic deviates from the first operating characteristic in the second rotational speed range such that for the same rotational speed values, the second operating characteristic specifies greater power values in relation to the same rotational speed values than the first operating characteristic.

5. The method as claimed in claim 1, wherein in the limited mode, the rotational speed does not exceed a specified rotational speed limit value and the second operating characteristic is provided up to the specified rotational speed limit value, and the second operating characteristic results in providing a higher power output than the first operating characteristic for rotational speeds below the specified rotational speed limit value.

6. The method as claimed in claim 1, wherein the normal mode and the limited mode have a variation of a tip speed ratio according to the wind speed and in a range of the wind speed, a variation of the tip speed ratio of the normal mode lies above a variation of the tip speed ratio of the limited mode.

7. The method as claimed in claim 5, comprising:
- in the limited mode, adjusting a blade angle before reaching the specified rotational speed limit value.

8. The method as claimed in claim 1, wherein:
- operating the wind power installation in the normal mode up to a first reference wind speed or until reaching a first reference rotational speed with a blade angle having a constant value,
- when the wind speed increases beyond the first reference wind speed or the rotational speed increases beyond the first reference rotational speed, increasing the blade angle according to the wind speed or the rotational speed,
- operating the wind power installation in the limited mode up to a second reference wind speed or until reaching a second reference rotational speed with the blade angle having a constant value, and
- when the wind speed increases beyond the second reference wind speed or the rotational speed increases beyond the second reference rotational speed further, increasing the blade angle according to the wind speed or the rotational speed, wherein the first reference wind speed is greater than the second reference wind speed or the first reference rotational speed is greater than the second reference rotational speed.

9. The method as claimed in claim 1, wherein:
- the first operating characteristic is provided for guiding the wind power installation to an operating point with a rated power and the first operating characteristic has, in a range before or up to the operating point, a first power gradient with respect to the rotational speed, and
- the second operating characteristic is provided for guiding the wind power installation to a reduced operating point with a reduced power in comparison with the rated power and the second operating characteristic has, in a range before or up to the reduced operating point, a second power gradient with respect to the rotational speed, wherein the first and second power gradients are substantially the same.

10. The method as claimed in claim 1, wherein the wind power installation includes:
- a rotational-speed/power controller configured to set a power to be generated by the wind power installation according to a detected rotational speed,
- a power adjusting device configured to receive the power set by the rotational-speed/power controller and set the power,
- a power/blade-angle controller configured to set a blade angle according to the power set by the rotational-speed/power controller or the power set by the power adjusting device, and
- blade adjusting units configured to receive the blade angle for adjusting the rotor blades of the wind power installation.

11. The method as claimed in claim 10, wherein:
- the rotational-speed/power controller is configured to store a first rotational-speed/power characteristic for the normal mode and a second rotational-speed/power characteristic for the reduced mode and select the first or second rotational-speed/power characteristic according to an operating mode, and
- the power/blade-angle controller is configured to store the first power/blade-angle characteristic for the normal mode and the second power/blade-angle characteristic for the reduced mode and select the first or second power/blade-angle characteristic according to the operating mode.

12. A wind power installation, comprising:
- a rotor having a plurality of rotor blades with adjustable blade angles, and
- a controller configured to:
    - operate the wind power installation in a full-load mode for delivering a system-specific maximum power,
    - operate the wind power installation in a partial-load mode for delivering a lower power up to the system-specific maximum power, and wherein operating the wind power installation in the partial-load mode includes operating the wind power installation selectively in a normal mode in which the wind power installation is operated according to a first operating characteristic or in a limited mode in which the wind power installation is operated according to at least one second operating characteristic, the first and the at least one second operating characteristics being different from each other and each specifying a relationship between a rotational speed of the rotor and a power to be generated, wherein
    - the at least one second operating characteristic results in providing more power for at least one rotational speed range than the first operating characteristic for the at least one rotational speed range.

13. The wind power installation as claimed in claim 12, comprising:
- a rotational-speed/power controller configured to specify the power to be generated by the wind power installation according to a detected rotational speed,
- a power adjusting device configured to set the power specified by the rotational-speed/power controller,
- a power/blade-angle controller configured to specify a blade angle to be set according to the power specified by the rotational-speed/power controller or the power set by the power adjusting device, and
- blade adjusting units configured to set the blade angle of the plurality of rotor blades.

14. The wind power installation as claimed in claim 13, wherein:
- the rotational-speed/power controller is configured to store a first rotational-speed/power characteristic for the normal mode and a second rotational-speed/power characteristic for the reduced mode are stored in and select the first or second rotational-speed/power characteristic according to an operating mode, and
- the power/blade-angle controller is configured to store a first power/blade-angle characteristic for the normal mode and a second power/blade-angle characteristic for the reduced mode and select the first or second power/blade-angle characteristic according to the operating mode.

15. A wind farm including a plurality of wind power installations including the wind power installation as claimed in claim 12.

\* \* \* \* \*